United States Patent [19]

Rau

[11] 4,264,326
[45] Apr. 28, 1981

[54] NEW DISPERSE DYESTUFFS; THEIR PREPARATION AND THEIR APPLICATIONS TO THE COLORATION OF SYNTHETIC MATERIALS

[75] Inventor: Manfred C. Rau, Amfreville la Campagne, France

[73] Assignee: Produits Chimiques Ugine Kuhlmann, Courbevoie, France

[21] Appl. No.: 96,707

[22] Filed: Nov. 21, 1979

Related U.S. Application Data

[62] Division of Ser. No. 921,133, Jun. 30, 1978, abandoned.

[30] Foreign Application Priority Data

Jul. 22, 1977 [FR] France ................. 77 22511

[51] Int. Cl.³ ............................................. C09B 29/08
[52] U.S. Cl. .................................... 8/662; 260/192; 264/78
[58] Field of Search .................. 8/41 R, 659, 662; 264/78

[56] References Cited

U.S. PATENT DOCUMENTS 1,935,712   11/1933   Herdieckehoff et al. ............ 260/529

FOREIGN PATENT DOCUMENTS 1370862   7/1961   France ................................. 260/178
1410212   8/1965   France ................................. 260/465
4731926   8/1972   Japan .................................. 260/154

OTHER PUBLICATIONS

Chem. Abstract, vol. 22, pp. 3640–3641, (1928).
Chem. Abstract, vol. 80, #120455a (1974).
Chem. Abstracts, vol. 83, #107665m #107666m.
Chem. Abstracts, vol. 79, #67805v (1973).
Chem. Abstracts, vol. 72, #106721n (1970).

Primary Examiner—Joseph L. Schofer
Assistant Examiner—Maria Parrish Tungol
Attorney, Agent, or Firm—Beveridge, Degrandi, Kline & Lunsford

[57] ABSTRACT

New disperse dyestuffs which may be used especially for the coloration of artificial or synthetic materials correspond to the general formula:

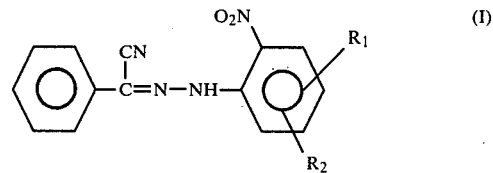

in which $R_1$ represents a hydrogen or halogen atom or a nitro, alkyl or alkoxy group and $R_2$ represents a hydrogen or halogen atom or a cyano group. These dyestuffs provide colorations of very fast yellow to orange shades on polyester fibers.

14 Claims, No Drawings

NEW DISPERSE DYESTUFFS; THEIR PREPARATION AND THEIR APPLICATIONS TO THE COLORATION OF SYNTHETIC MATERIALS

This is a division of application Ser. No. 921,133, filed June 30, 1978, now abandoned.

BACKGROUND OF THE INVENTION

1. Field of the Invention

The present invention relates to new disperse dyestuffs which may be used especially for the coloration of artificial or synthetic materials.

2. Summary of the Invention

The dyestuffs according to the present invention may be represented by the general formula:

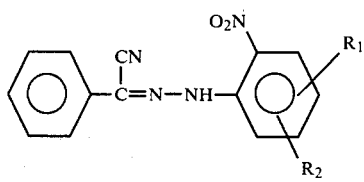

in which $R_1$ represents hydrogen, halogen, nitro, alkyl or alkoxy and $R_2$ represents hydrogen, halogen or cyano.

3. Description of the Preferred Embodiments

The halogen is preferably chlorine or bromine. The alkyl or alkoxy group which may be represented by $R_1$ contains 1 to 4 carbon atoms and is preferably methyl, methoxy or ethoxy.

These compounds may be prepared by reacting the diazo derivative of an o-nitro-aniline of the formula:

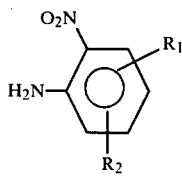

with a compound of the formula:

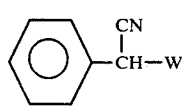

in which formula $R_1$ and $R_2$ have the same significance as above and W represents an electro-attractor group which can be eliminated, for example an acyl group, especially an acetyl group.

The reaction of the diazo derivative of o-nitro-aniline of formula (II) with the compound of formula (III) is effected under the usual coupling conditions, the coupling component of formula (III) being able to be dissolved in water or in an organic solvent such as acetic acid.

The elimination of the group W is generally effected of itself during and/or after the coupling reaction, the speed of this elimination being a function of the substituents $R_1$ and $R_2$ and of the nature of the group W. In order to accelerate or possibly terminate the elimination of the group W, the reaction product may be taken up in an organic solvent such as, for example, acetic acid, methanol or ethanol, preferably at the boil.

The dyestuffs according to the invention are perfectly suitable for dyeing and printing all materials which can be dyed by disperse dyestuffs, especially those based on hydrophobic fibers such as polyurethane fibers, polyolefine fibers such as polypropylene either unmodified or modified by basic treatment or by treatment with nickel, cellulose diacetate or triacetate fibers and, above all, polyamide fibers such as Nylon-6, Nylon-6,6 and Nylon-12, aromatic polyesters such as those of terephthalic acid and ethylene glycol or 1,4-dimethylol-cyclohexane or mixed polymers of terephthalic and isophthalic acid with ethylene glycol.

The application of the dyestuffs according to the invention may be effected according to any known method of coloration by means of disperse dyestuffs.

Thus, for dyeing in aqueous baths, the dyestuffs according to the invention, insoluble or very sparingly soluble in water, are advantageously used in finely divided form and the operation is carried out in the presence of dispersants such as residual cellulose sulfite liquor or of synthetic detergents and of a combination of various wetting agents and dispersants. In general, it is advantageous to convert the dyestuffs to be used before their application into a tinctorial preparation, containing the dispersant and the finely divided dyestuff in a form such that by dilution of the preparation with water a fine dispersion is obtained. Such tinctorial preparations may be obtained in a known manner, for example by grinding the dyestuff in dry form or wetted, with or without addition of dispersants during this grinding. After wet grinding, tinctorial preparations containing textile auxiliary agents and the dyestuff are obtained by subsequent drying.

Examples of advantageous dispersants of the non-ionic category include the products of addition of 8 moles of ethylene oxide with 1 mole of p-tertio-octylphenol, 15 to 16 moles of ethylene oxide with castor oil, 20 moles of ethylene oxide with the alcohol $C_{16}H_{33}OH$, the products of addition of ethylene oxide with di-[α-phenylethyl]-phenols, the polyethylene oxide-tertio-dodecylthioethers, the polyamine-polyglycolethers, and the products of addition of 15 or 30 moles of ethylene oxide with one mole of dodecylamine or stearylamine.

Anionic dispersants which may be used include the sulfuric esters of fatty alcohols having 8 to 10 atoms of carbon, the sulfuric esters of the products of addition of ethylene oxide derived from the corresponding fatty amides or from alkylated phenols containing 8 to 12 carbon atoms in the alkyl residue, sulfonic esters containing alkyl residues having 8 to 20 carbon atoms, the sulfation products of fatty acids and unsaturated oils, the phosphoric esters containing alkyl residues having 8 to 20 carbon atoms, fatty acid soaps, the alkylarylsulfonates, the products of condensation of formaldehyde with naphthalenesulfonic acid and the sulfonates of lignin.

Suitable cationic dispersants are quaternary compounds of ammonium which contain alkyl residues or aralkyl residues having 8 to 20 carbon atoms.

The tinctorial preparations may also contain, in addition to dispersants, organic solvents, particularly those boiling above 100° C., which are advantageously miscible with water, such as the mono- and di-alkylglycolethers, dioxan, dimethyl formamide or -acetamide, tetramethylene sulfone or dimethyl sulfoxide. It is advantageous to grind the dyestuff, the dispersant and the solvent together. One can also use only solvents alone in place of the dispersant, but the tinctorial preparations must contain either a dispersant or a solvent.

The dyeing of polyester fibers with the dyestuffs according to the invention is effected in aqueous dispersion according to the processes used for the polyesters. The polyesters of aromatic polycarboxylic acid and polyalcohol are preferably dyed at temperatures above 100° C. and under pressure. The dyeing can also be effected at the boiling point of the dyebath in the presence of carriers such as, for example, polyphenols, compounds of diphenyl-polychlorobenzene, or analogous auxiliary products, or also according to the Thermosol process, that is, by foularding with subsequent heat treatment, for example, a heat fixation at 180°–210° C. The fibers of cellulose diacetate are advantageously dyed at temperatures of 80° to 85° C., while the fibers of cellulose triacetate are dyed at the boiling point of the dyebath. For dyeing cellulose diacetate or fibers of polyamides, it is unnecessary to use carriers.

For the heat-fixation of the dye, the foularded polyester fabric is heated, advantageously after previous drying, for example, in a current of hot air at temperatures exceeding 100° C., advantageously between 180° and 210° C. The dyeings obtained may undergo a subsequent treatment, for example, by heating in an aqueous solution of a non-ionic detergent.

Instead of impregnation, the dyestuffs according to the invention may also be applied by printing. For this purpose, a printing color is used which contains, in addition to the usual auxiliary agents such as wetting agents and thickeners, the finely dispersed dyestuff.

The dyestuffs according to the invention may also be applied in a solvent medium, for example in perchlorethylene, alone or in admixture with 5–10% of dimethyl formamide or methanol.

With the dyes according to the invention, full-bodied dyeings and prints are obtained which have good fastness, especially to heat-fixing, sublimation, folding or creasing, flue gas, over-dyeing, dry cleaning, to chlorine and to wetting, for example to water, washing and perspiration.

The dyestuffs according to the invention may also be used for dyeing in bulk polyamide, polyester and polyolefin yarns. The polymer to be dyed is preferably mixed in the form of powder, grains, shavings, completely prepared solutions for spinning or in molten form, with the dyestuff which is incorporated in dry form or in the form of a dispersion or solution in a possibly volatile solvent. After homogenous distribution of the dye in the solution or in the molten mass of the polymer, the mixture is treated in a known manner by milling, pressure or extrusion, in order to obtain fibers, threads, filaments, films, etc. The dyestuffs according to the invention give deep and uniform colorations having good fastness to light and good general fastness.

The dyestuffs according to the invention are distinguished particularly by their good general properties of application (affinity and fastness to light) on polyester fibers.

In comparison with known dyestuffs. (French Pat. No. 1,410,212 (corresponding to U.S. Pat. No. 3,313,798) and Japanese patent application Nos. 72/31,926 and 73/19,871) which contain a heterocyclic residue (for example, benzimidazolyl) in place of the unsubstituted phenyl radical, the dyestuffs according to the invention have a better affinity for polyester fibers. Furthermore, the dyestuffs according to the invention are, on said fibers, faster to light than the compound of the formula:

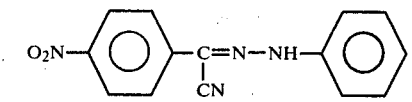

which is disclosed in the review Talanta 1970, 17 (2) pages 161–5 (see Chemical Abstracts vol. 72, 1970, No. 106721n) and is proposed as an acid-base indicator.

In the following non-restrictive examples, the parts and the percentages are by weight, unless the contrary is mentioned. The parts by weight and the parts by volume are in the same relation as the gram and the milliliter.

EXAMPLE 1

7.14 Parts of 2,4-dinitro-aniline are dissolved in 58.4 parts of 94% sulfuric acid, then the solution is cooled to 0° C. and diazotized at this temperature by means of a solution of 1.35 parts of sodium nitrite in 19.25 parts of sulfuric acid. A solution of 9.3 parts of α-acetyl α-phenyl acetonitrile in 400 parts of acetic acid is introduced into the solution of diazo compound thus formed, while assuring that the temperature does not exceed 5° C. The mixture is then stirred for 30 minutes, then run on 2000 parts of water and 400 parts of crushed ice. The precipitate obtained is filtered off and washed, then treated in 500 parts of ethyl alcohol at the boil. The dyestuff of the formula:

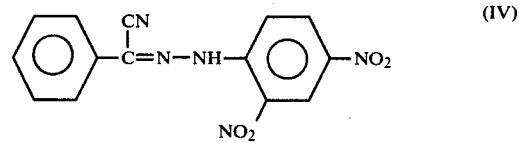

a yellow product which melts at 250° C., is thus obtained.

| Gravimetric analysis: | C % | H % | N % |
| --- | --- | --- | --- |
| Calculated for $C_{14}H_9N_5O_4$ | 54.02 | 2.89 | 22.50 |
| Found | 53.93 | 3.12 | 22.51 |
| Infra-red spectrum (KBr): | | | |
| 3250 cm$^{-1}\gamma$(NH); 2200 cm$^{-1}\gamma$(CN) | | | |

The nuclear magnetic resonance spectrum of the proton (60 Mc, solvent pyridine —D$^5$) shows the aromatic H and the absence of aliphatic H.

This dyestuff has an excellent affinity for polyester fibers which it dyes in a green-yellow shade having excellent fastness, especially to light, including the case when this dyestuff is used in admixture with other dyestuffs.

EXAMPLE 2

21.6 Parts of 2-nitro-4-chloro-aniline and 50 parts by volume of 30% hydrochloric acid are stirred for 30 minutes, then 200 parts of water and 200 parts of ice are added to this solution. At a temperature of 0° C., 18 parts of a 50% solution of sodium nitrite are added, and after stirring, the solution of diazo compound is filtered at between 0° and 5° C. The clear solution of diazonium salt, maintained at 0° C., is then slowly poured into a solution previously cooled to 0° C. of 20 parts of α-acetyl α-phenyl acetonitrile, 25 parts of sodium carbonate and 600 parts of water. During the addition of the diazonium salt, a pH of 8-9 is maintained by addition of sodium carbonate. The precipitate is filtered off, then treated in ethyl alcohol at the boil. The dyestuff of the formula:

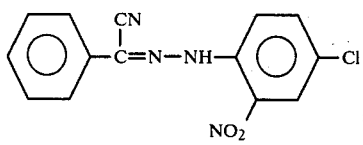

(V)

a yellow product which melts at 174° C., is thus obtained.

| Gravimetric analysis: | C % | H % | N % | Cl % |
|---|---|---|---|---|
| Calculated for $C_{14}H_9ClN_4O_2$ | 55.87 | 2.99 | 18.63 | 11.81 |
| Found | 56.12 | 3.21 | 18.57 | 11.52 |
| Infra-red spectrum (KBr): | | | | |
| 3240 cm$^{-1}$γ(NH); 2200 cm$^{-1}$γ(CN) | | | | |

This dyestuff dyes polyester fibers in a golden yellow shade.

EXAMPLE 3

The procedure of Example 2 was repeated using 26 parts of 2-nitro-4-methoxy-aniline and 24 parts of α-acetyl α-phenyl acetonitrile. The orange yellow product obtained, purified in pure acetic acid, corresponds to the following structural formula:

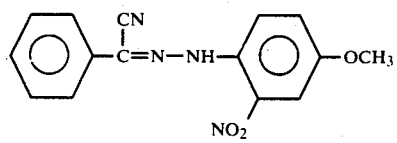

(VI)

| Gravimetric analysis: | C % | H % | N % |
|---|---|---|---|
| Calculated for $C_{15}H_{12}N_4O_3$ | 60.80 | 4.06 | 18.91 |
| Found | 61.27 | 4.37 | 18.69 |

M.p.: 145° C.

Infra-red spectrum (KBr): 3240 cm$^{-1}$γ(NH); 2200 cm$^{-1}$γ(CN).

Nuclear magnetic resonance spectrum of the proton (60 Mc, solvent $CF_3CO_2D$): δ($OCH_3$)=4.05 ppm, singulet, δ(aromatic H) from 7.4 to 8.2 ppm.

This dyestuff dyes polyester fibers in an orange shade.

EXAMPLE 4

The procedure of Example 1 was repeated using 7.6 parts of 2-nitro-4-methyl-aniline and 8.5 parts of α-acetyl α-phenyl acetonitrile. The dyestuff of the formula:

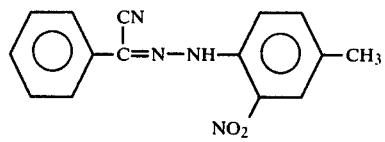

(VII)

a yellow product which melts at 161° C., is obtained.

| Gravimetric analysis: | C % | H % | N % |
|---|---|---|---|
| Calculated for $C_{15}H_{12}N_4O_2$ | 64.28 | 4.28 | 20.00 |
| Found | 64.28 | 4.22 | 20.05 |

This dyestuff dyes polyester fibers in a golden yellow shade.

EXAMPLE 5

The procedure of Example 1 was repeated using 10 parts of 2,4-dinitro-5-chloro-aniline and 8.475 parts of α-acetyl α-phenyl acetonitrile. The yellow dyestuff obtained, purified in ethyl alcohol, corresponds to the following structural formula:

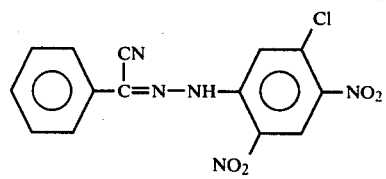

(VIII)

M.p.: 244° C.

| Gravimetric analysis: | C% | H% | N% |
|---|---|---|---|
| Calculated for $C_{14}H_8ClN_5O_4$ | 48.63 | 2.32 | 20.25 |
| Found | 48.96 | 2.44 | 20.29 |

This dyestuff dyes polyester fibers in a green yellow shade.

EXAMPLE 6

Example 1 was repeated with the exception that the 2,4-dinitro-aniline is replaced by an equimolecular quantity of 2-nitro-aniline and the dyestuff of the formula:

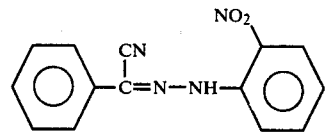

(IX)

which melts at 190° C. is obtained. It dyes polyester fibers in a yellow shade.

| Gravimetric analysis: | C % | H % | N % |
|---|---|---|---|
| Calculated for $C_{14}H_{10}N_4O_2$ | 63.15 | 3.76 | 21.05 |
| Found | 63.10 | 3.62 | 20.91 |

EXAMPLE 7

Example 1 was repeated with the exception that the 2,4-dinitro-aniline is replaced by an equimolecular quantity of 2-amino-3,5-dinitro-benzonitrile, and the dyestuff of the formula:

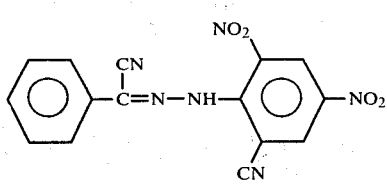

(X)

which melts above 260° C., is obtained. It dyes polyester fibers in a golden yellow shade.

| Gravimetric analysis: | C % | H % | N % |
|---|---|---|---|
| Calculated for $C_{15}H_8N_6O_4$ | 53.57 | 2.38 | 25.00 |
| Found | 53.38 | 2.70 | 24.63 |

EXAMPLE 8

4 Parts of the dyestuff described in Example 1, 2 parts of a dispersing agent of the lignosulfonate type and a sufficient amount of water and acetic acid to take the pH to 6–7 and the weight to 80 parts, are ground. By means of the dispersion thus obtained, which contains 5% of the dyestuff of Example 1, two dye-baths are prepared having the following composition:

|  | Parts: |
|---|---|
| 5% Dispersion | 0.9 or 3 |
| Water | 100 |
| 10% Acetic acid | 0.5 |
| 10% Ethoxylated castor oil (Sunaptol LT) | 1.0 |

5 Parts of ethyleneglycol polyterephthalate fibers are introduced into each bath, then they are heated in an autoclave to 120° or 130° C. and maintained at this temperature for one hour. After dyeing, the fibers are treated for 5 minutes at 80°–85° C. in an aqueous solution of sodium hydrosulfite. The fibers are dyed in deep green-yellow shades with excellent fastness, especially to light.

What is claimed is:

1. A process for the coloration of cellulose diacetate, cellulose triacetate, polyurethane, polyolefine, polyamide or aromatic polyester fibers which comprises applying to said fibers a dyestuff of the general formula:

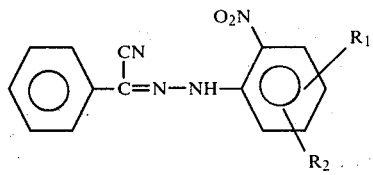

(I)

in which $R_1$ represents hydrogen, halogen, nitro, alkyl or alkoxy, and $R_2$ represents hydrogen, halogen or cyano.

2. The process according to claim 1 in which the alkyl or alkoxy group of the dyestuff contains from one to four carbon atoms.

3. The process according to claim 1 in which $R_1$ in said dyestuff is methyl, methoxy or ethoxy.

4. The process according to claim 1 in which the halogen in said dyestuff is chlorine or bromine.

5. The process according to claim 4 in which the alkyl or alkoxy group of the dyestuff contains from one to four carbon atoms.

6. The process according to claim 4 in which $R_1$ in said dyestuff is methyl, methoxy or ethoxy.

7. The process according to claim 1 in which the dyestuff corresponds to the formula:

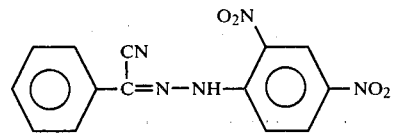

(IV)

8. Cellulose diacetate, cellulose triacetate, polyurethane, polyolefine, polyamide or aromatic polyester fibers colored by means of a dyestuff of the general formula:

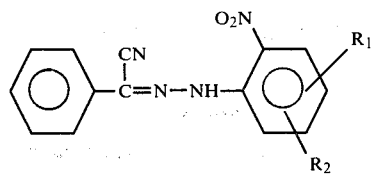

(I)

in which $R_1$ represents hydrogen, halogen, nitro, alkyl or alkoxy, and $R_2$ represents hydrogen, halogen or cyano.

9. The colored fibers according to claim 8 in which the alkyl or alkoxy group of the dyestuff contains from one to four carbon atoms.

10. The colored fibers according to claim 8 in which $R_1$ in said dyestuff is methyl, methoxy or ethoxy.

11. The colored fibers according to claim 8 in which the halogen in said dyestuff is chlorine or bromine.

12. The colored fibers according to claim 11 in which the alkyl or alkoxy group of the dyestuff contains from one to four carbon atoms.

13. The colored fibers according to claim 11 in which the halogen in said dyestuff is chlorine or bromine.

14. The colored fibers according to claim 4 in which the dyestuff corresponds to the formula:

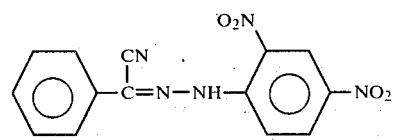

(IV)

* * * * *